Nov. 18, 1941.                    P. HAIG                    2,263,356
                          SAFETY DEVICE FOR HOOKS
                           Filed Jan. 23, 1941
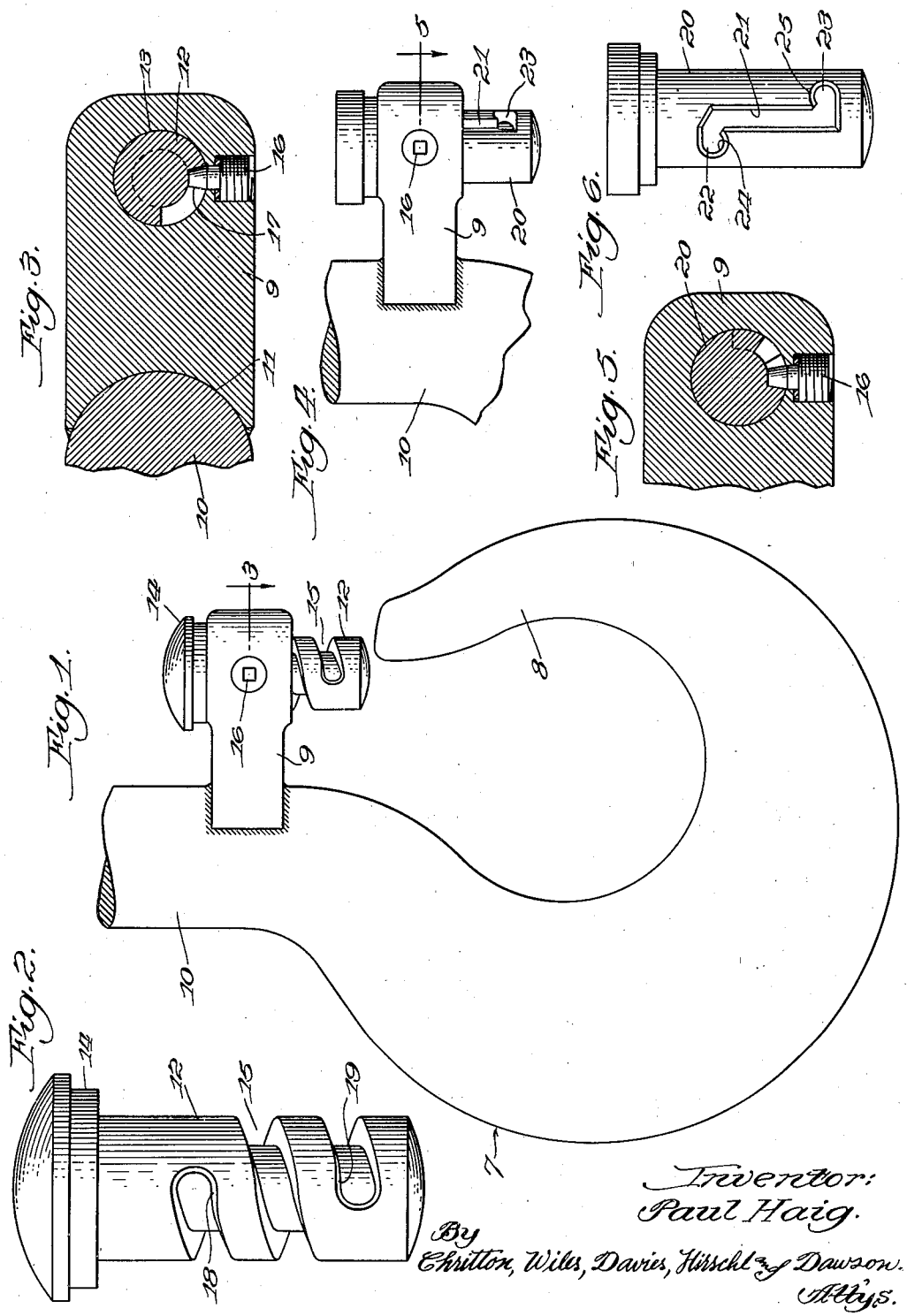

Patented Nov. 18, 1941

2,263,356

UNITED STATES PATENT OFFICE 2,263,356

SAFETY DEVICE FOR HOOKS

Paul Haig, Chicago, Ill., assignor to Inland Steel Company, Chicago, Ill., a corporation of Delaware Application January 23, 1941, Serial No. 375,675

4 Claims. (Cl. 24—241)

My invention relates generally to hooks but more particularly, though not exclusively, to crane hooks which in use support a chain-ring, or sling.

One of my objects is to provide a construction of safety device for positively holding such a chain-ring, sling, or other member looped over the hook, against disengagement from the hook particularly with a view to preventing injury to the workmen.

Another object is to provide such a device which will stand the severe abuse to which crane hooks are subjected in practice.

Another object is to provide such a device which will remain in either hook-open or hook-closed position without requiring a pin, bolt, or latch, to hold it in either position.

Another object is to provide a simple construction of device for this purpose; and other objects as will be manifest from the following description.

Referring to the accompanying drawing:

Figure 1 is a view in side elevation of the lower portion of a crane hook equipped with a safety device in accordance with my invention.

Figure 2 is an enlarged view of the movable element of the safety device.

Figure 3 is an enlarged fragmentary sectional view taken at the line 3 on Fig. 1 and viewed in the direction of the arrow.

Figure 4 is a fragmentary view in side elevation of a crane hook showing it equipped with a safety device constituting another embodiment of the invention.

Figure 5 is an enlarged fragmentary sectional view of the structure of Fig. 4 the section being taken at the line 5 on Fig. 4 and viewed in the direction of the arrow; and Figure 6, a view in side elevation of the movable element of the device of Figs. 4 and 5.

Referring to the construction shown in Figs. 1-3, 7 represents a crane hook, as for example as commonly provided in cranes, which it is desired be provided with a safety device adapted to cooperate with the point portion 8 of the hook for preventing the part which is looped over the hook, such as for example the chain-ring, or sling, (not shown) commonly used, from accidentally disengaging from the hook.

The safety device shown, for this purpose, comprises a bracket 9, shown as in the form of a bar, secured to the shank portion 10 of the hook with its outer end extending crosswise of the point portion 8 and in spaced relation thereto as shown. In the arrangement shown the end of the bar 9 at which it is secured to the shank 10 of circular shape in cross section, is recessed, as represented at 11 to conformingly fit the side of the shank 10 to which it is welded at the exposed joints.

The safety device also comprises a pin 12 opposing the point 8 of the hook which is rotatable and longitudinally movable in an opening 13 in the outer end of the bar 9, the upper end of the pin 12 having a head 14 and the pin being provided peripherally with a helical groove or thread 15. Secured in the bar 9 is a transverse stud 16 shown in the form of a screw, screwed into the bar 9 with its inner end tapered as shown at 17 at which portion it extends into the groove 15 in the pin 12, whereby upon rotating the pin, as for example by grasping the head 14, the pin is caused to move lengthwise toward or away from the hook-point 8, depending on the direction in which the pin is rotated, into and out of the hook-closing position substantially as shown in Fig. 1, the structure being adapted to have the part to be suspended from the hook looped over the hook when the pin 12 is in raised position and to prevent separation of said part from the hook when the pin 12 is in lowered position (Fig. 1).

To resist forces which may be exerted against the pin 12 in use, tending to force it lengthwise and thus positively hold the pin in either hook-closed or hook-open position the end portions of the groove 15 are so shaped as to extend more nearly at a right angle to the longitudinal axis of the pin 12 than the main portion of the groove and thus serve to interlock with the stud 16 in the extreme positions of the pin. As specifically shown, the end portions of the groove 15 are leveled off as represented at 18 and 19, respectively, to produce the result stated.

The construction shown in Figs. 4, 5 and 6 is the same as that shown in the preceding figures except that instead of providing the pin, herein shown at 20, as a member having a helical groove, it is provided peripherally with a longitudinal groove 21 into which the stud 16 extends, the groove 21 at its ends projecting laterally, in opposite directions, viz., crosswise of the pin 20, as indicated at 22 and 23, to receive the stud upon slightly turning the pin 20, in one direction or the other at the end of the sliding movements of the pin for closing and opening the hook, the engagement of the stud with the groove-extensions 22 and 23 affording interlocks which resist vertical forces tending to slide the pin out of either of the hook-closed or hook-open positions, Preferably those surfaces of the groove extensions 22 and 23 which coact with the stud 16 to prevent sliding of the pin 20 out of hook-closed position and out of hook-open position are recessed as represented at 24 and 25, respectively, thus in effect, socketing the stud 16.

While I have illustrated and described certain constructions constituting embodiments of my invention I do not wish to be understood as intending to limit the invention thereto as the structures shown may be variously modified and altered and the invention embodied in other forms of structure without departing from the spirit of the invention.

What I claim as new and desire to secure by Letters Patent, is:

1. The combination with a hook device, of a safety device therefor comprising a rotatable member on the hook device opposing the point of the hook and having a spiral groove and a projection on said hook device extending into said groove whereby said member moves lengthwise when rotated, an end of said groove extending in such position relative to the longitudinal axis of said member that, when it engages said projection, said member will be held against accidental lengthwise displacement.

2. The combination with a hook device, of a safety device therefor comprising a rotatable member on the hook device opposing the point of the hook and having a spiral groove and a projection on said hook device extending into said groove whereby said member moves lengthwise when rotated, the ends of said groove extending in such positions relative to the longitudinal axis of said member that, when either of said ends engage said projection, said member will be held against accidental lengthwise displacement.

3. The combination with a hook device, of a safety device therefor comprising a member opposing the point of the hook and movable toward and away from said point into and out of a position for closing said hook, said hook device having a lateral projection and said member having a groove into which said projection extends, an end of said groove extending laterally and receiving said projection for holding said member against lengthwise displacement in one direction.

4. In combination with a hook device, of a safety device therefor comprising a member opposing the point of the hook and movable toward and away from said point into and out of a position for closing said hook, said hook device having a lateral projection and said member having a groove into which said projection extends, the ends of said groove extending laterally and receiving said projection for holding said member against lengthwise displacement in one direction.

PAUL HAIG.